United States Patent [19]
Soya et al.

[11] 3,733,896
[45] May 22, 1973

[54] COMPUTING APPARATUS FOR A CALORIMETER

[75] Inventors: Masahiro Soya, Kawasaki; Kensuke Aizawa, Yokohama; Hiroaki Hasegawa, Tokyo, all of Japan

[73] Assignee: Tokico Ltd., Kawasaki-City, Kanagawa-Ken, Japan

[22] Filed: Sept. 14, 1971

[21] Appl. No.: 180,389

[30] Foreign Application Priority Data

Sept. 14, 1970 Japan ............................... 45/80798

[52] U.S. Cl. .................. 73/193 R, 74/194, 235/61 C
[51] Int. Cl. ........................................... G01k 17/12
[58] Field of Search ................... 73/193, 193 R, 206, 73/507; 74/194; 235/61

[56] References Cited

UNITED STATES PATENTS

| | | | |
|---|---|---|---|
| 3,613,447 | 10/1971 | Ishiitawa et al. | 73/193 |
| 1,088,280 | 2/1914 | Hottinger | 73/193 |
| 3,385,111 | 5/1968 | McGinn | 235/61 X |

Primary Examiner—Herbert Goldstein
Attorney—Holman & Stern

[57] ABSTRACT

In a calorimeter, a computing apparatus in which a rotating member is rotated in proportion to a flow quantity of a heat medium, a roller in abutting contact with the rotating member and being rotated by the rotation thereof, means displaces the roller in a pivotal motion responsive to the variation of temperature difference of the heat medium, and an indicator integrating and indicating heat quantity by obtaining the rotation of the roller. The rotational velocity of the roller is changed responsive to a change of the angle between the tangential direction of the rotating member and the axis of rotation of the roller at a point at which the roller is in contact with the rotating member. Such change of the angle is due to the variation of the temperature difference of the heat medium.

7 Claims, 4 Drawing Figures

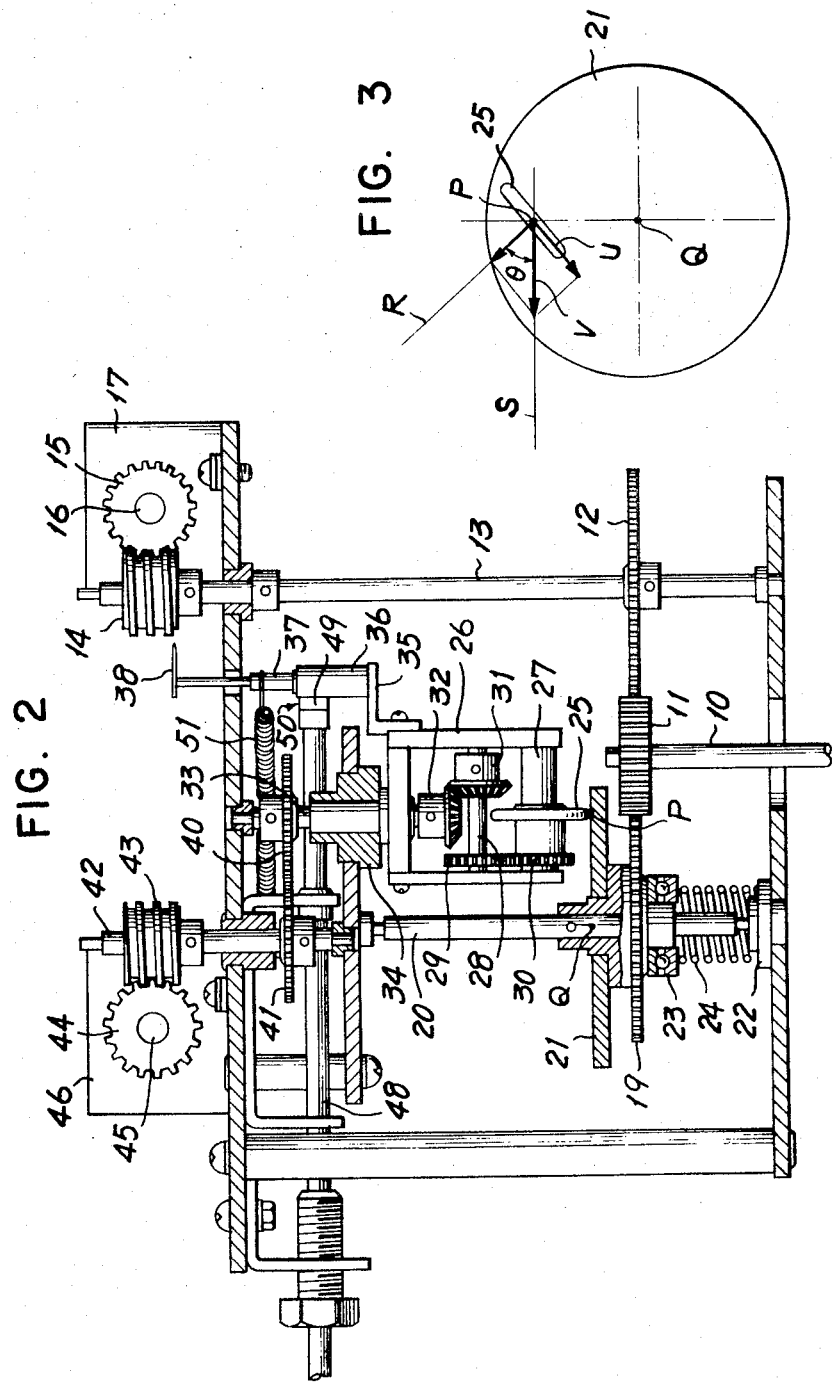

COMPUTING APPARATUS FOR A CALORIMETER

BACKGROUND OF THE INVENTION

This invention relates to a computing apparatus for a calorimeter, and more particularly, to a computing apparatus which is capable of a continuous multiplication of a flow quantity and temperature difference of a heat medium.

A calorimeter is generally used in an air conditioning apparatus, a heating apparatus for measuring heat quantity which a heat medium absorbs or radiates during cooling or heating. This calorimeter makes multiplication of the flow quantity of the heat medium and the temperature difference of the heat medium between points before and after a heat exchanger provided in a heating or air conditioning apparatus, thereby obtaining its result as heat quantity.

PRIOR ART

There has been used, as a computing apparatus for a calorimeter, a cam type apparatus in which a roller rotating in proportion to the flow quantity is revolving along a periphery of a cam which is a part of a cam assembly consisting of a stationary cam and a cam which is displaced in proportion to a temperature difference. In this apparatus, the result of computation is obtained in accordance with the distance of the portion of the roller which has entered the recess of the cam (the interval of the recess of the cam). This conventional apparatus, however, is disadvantageous in that its revolving power is low and, accordingly, it is low in its measuring accuracy because it can only make an intermittent computation. There has also been used an apparatus in which a differential gear is revolved in proportion to a temperature difference and the number of revolutions is computed as heat quantity. This conventional apparatus has a very complicated gear mechanism, so that manufacture and adjustment of the apparatus involve troublesome work and the cost of manufacture is high.

OBJECTS AND SUMMARY OF THE INVENTION

It is therefore a general object of the invention to eliminate the disadvantages of the aforementioned conventioned apparatus and to provide a novel and useful computing apparatus for a calorimeter.

Another object of the invention is to provide a computing apparatus for a calorimeter which is capable of a continuous or stepless multiplication of the flow quantity of heat medium and its temperature difference. The apparatus according to the invention is capable of responding to a very small variation in temperature and therefore is capable of measuring heat quantity with a high accuracy. The apparatus is also capable of measuring heat quantity accurately even at times when computation starts and ends.

A further object of the invention is to provide a computing apparatus for a calorimeter which is of a very simple construction. The apparatus simply comprises a rotary member rotated by a flowmeter, a roller which is in abutting contact with this rotary member and is rotated thereby, means for angularly displacing the roller in response to the temperature difference, and an indicator which integrates and indicates heat quantity by the rotation of the roller. The means for displacing the roller can displace the roller with only a slight force by simply displacing the roller in a pivotal motion.

Other objects and features of the invention will become apparent from the description made hereinbelow with reference to the accompanying drawings, in which:

BRIEF DESCRIPTION OF THE DRAWINGS

FIG. 2 is a side elevational view of the computing apparatus shown in FIG. 1;

FIG. 3 is a diagram for explaining the principle of operation of the computing apparatus according to the invention.

DETAILED DESCRIPTION OF THE EMBODIMENTS

Figure 1:
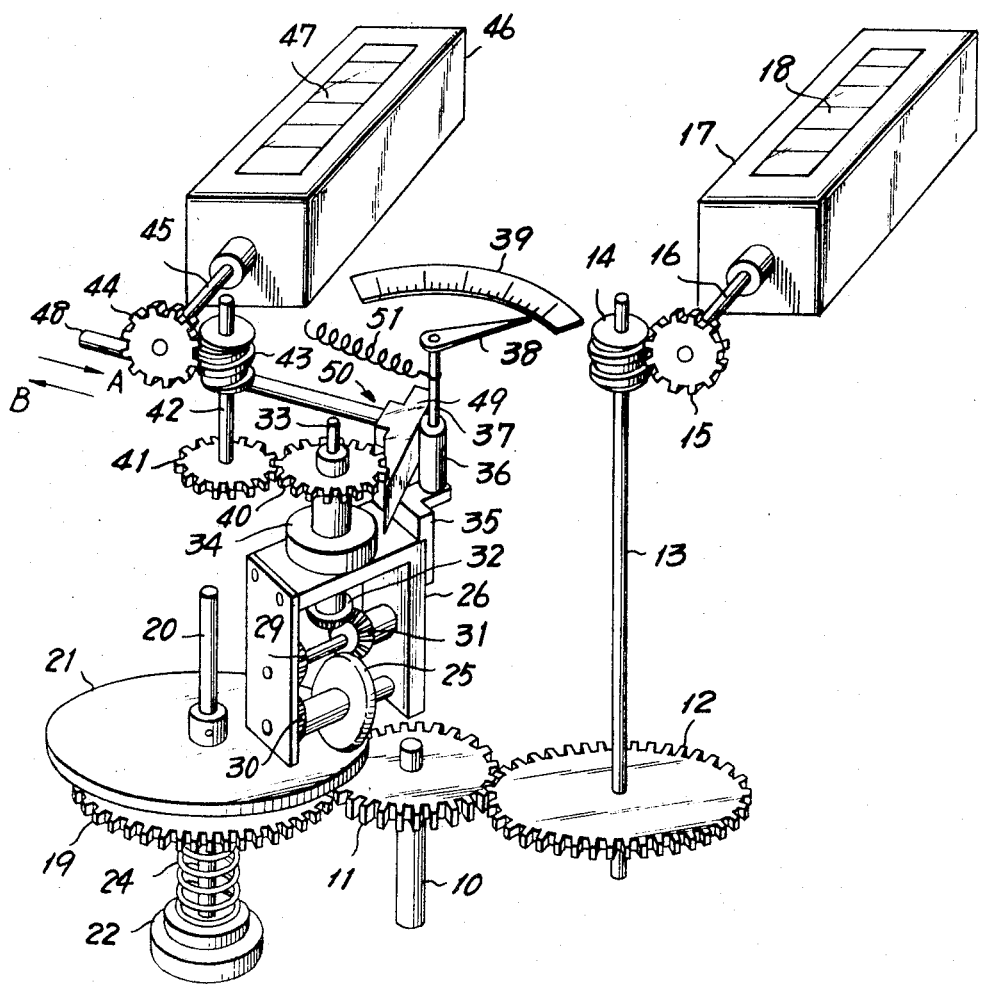
FIG. 1 is a perspective view of one embodiment of the computing apparatus according to the invention.

First, one embodiment of the computing apparatus according to the invention will be described with reference to FIGS. 1 and 2. FIG. 1 is a schematic perspective view of the apparatus in a state in which the direction of the axis of rotation of the roller makes an angle of less than 90° with the tangential direction of the disc at a point where the roller makes contact with the disc. FIG. 2 is a side elevational view of the apparatus in a state in which the direction of the axis of rotation of the roller crosses at right angles with the tangential direction of the disc at the aforementioned contact point, i.e. a state in which the direction of rotation of the roller coincides with the tangential direction.

In FIGS. 1 and 2, a rotating shaft 10 is rotated by a rotational force which is an output of measurement in a flowmeter (not shown). The flowmeter is adapted to measure the flow quantity of a heat medium such as a warm water in case of a heating apparatus or a cold water in case of an air conditioning apparatus which flows through a heat exchanger (not shown) provided for radiation or absorption of heat. A gear 11 is fixedly mounted at the upper end of the shaft 10. A gear 12 which is in mesh with the gear 11 is fixedly mounted on a shaft 13. The shaft 13 is rotated by a rotational force transmitted by the shaft 10. The rotation of the shaft 13 is transmitted through gears 14 and 15 to a shaft 16, whereby the integrated flow quantity of the heat medium is indicated on an indication part 18 of a counter 17.

In the meanwhile, the rotation of the shaft 10 is transmitted through a shaft 20 fixedly mounting a gear 19 which is in mesh with the gear 11 to a rotary disc 21 which is fixedly mounted on the shaft 20. The shaft 20 which carries the gear 19 and the rotary disc 21 is supported in such a manner that it is slightly vertically slidable. Due to a resilient force of a spring 24 provided between a stationary bearing 22 and a bearing 23 mounted under the gear 19, the rotary disc 21, the shaft 20 and the gear 19 are always subject to a force acting upwardly.

A roller 25 is fixed to a shaft 27 which is rotatably supported on a frame 26. A gear 29 fixedly mounted on one end of a shaft 28 is in mesh with a gear 30 which is fixedly mounted on one end of the shaft 27. A bevel gear 31 fixed to the other end of the shaft 28 is in mesh with a bevel gear 32 fixed to the lower end of a shaft 33. The frame 26 substantially has an inverted U shape, and is rotatably supported on a bearing 34. A projection 35 is fixedly mounted on one side of the frame 26, and a pin 36 is mounted uprightly on the projection 35. A shaft 37 is fixed to the pin 36 and a pointer 38 is fixed at the upper end of the shaft 37. The pointer 38 is rotated with the shaft 37 and indicates the temperature difference on an indicating scale plate 39.

A gear 40 fixedly mounted at the upper end of the shaft 33 is in mesh with a gear 41. The rotation of the gear 40 is transmitted through a gear 41, a shaft 42 and gears 43 and 44 to a shaft 45. By the rotation of the shaft 45, calories computed in a manner to be described later are indicated on an indication part 47 of a counter 46.

A displacing lever 50 which substantially has a T-shape consists of a pushing rod 48 and a pushing portion 49. The rod 48 of the displacing lever 50 is displaced rectilinearly in response to the variation in the temperature difference between two temperature detection parts respectively provided before and after the heat exchanger on the flow passage of the heat medium. The amount of displacement of the rod 48 is in proportion to this difference in temperature. The mechanism for converting the difference in temperature detected by the two temperature detection parts provided before and after the heat exchanger on the flow passage of the heat medium into the amount of displacement are already known, and therefore the description thereof will be omitted.

The rectilinear displacement of the rod 48 of the displacing lever 50 causes the pushing portion 49 to push the pin 36, thereby displacing the frame 26 in a pivotal movement. A spring 51 stretched between the shaft 37 and a fixed part gives a rotational force to the frame 26 in a direction in which the pin 36 always abuts against the pushing portion 49 of the displacing lever 50.

As the material of the rotary disc 21 and the roller 25, a material of a relatively large friction factor and of a large wear-resisting characteristic should preferably be used. In the present embodiment, the rotary disc 21 is made of bakelite containing cloth, and the roller 25 of tungsten carbide.

The operation of the apparatus of the above mentioned construction will be described. When the heat medium flows through the heat medium passage pipe on which the heat exchanger is provided, the flow quantity of the heat medium is measured by the flowmeter and the number of rotations which is the result of the measurement is transmitted to the shaft 10. The rotation of the shaft 10 is transmitted, on one hand, to the shaft 16 through the gears 11 and 12, the shaft 13 and the gears 14 and 15. As a result, the flow quantity of the heat medium is sequentially integrated and indicated on the indication part 18 of the counter 17.

The rotation of the shaft 10 is transmitted, on the other hand, to the rotary disc 21 through gears 11 and 19 and the shaft ). Inasmuch as the heat medium is a hot medium such as a warm water in case of heating whereas it is a cold medium such as a cold water in case of cooling, the heat medium radiates heat when it passes through the heat exchanger during heating or absorbs heat during cooling. The amount of displacement which is proportionate to the variation in the temperature difference of the heat medium between the points before and after the heat exchanger on the flow passage of the heat medium due to the aforementioned heat radiation or absorption is transmitted to the rod 48 of the displacing lever 50. Consequently, the displacing lever 50 is displaced rectilinearly either in the direction of arrow A or B. Since the pin 36 is pulled by the spring 51 so that it is always in abutting contact with the pushing portion 49 of the displacing lever 50, the frame 26 which is integral with the projection 35 to which the pin 36 is fixed is displaced in a pivotal motion after the shaft 33 in proportion to the rectilinear displacement of the displacing lever 50. Simultaneously, the roller 25 is also displaced in a pivotal motion integrally with the frame 26 while it remains in contact with the rotary disc 21. At this time, the contact point P of the roller 25 and the rotary disc 21 is on the axis of the shaft 33. Hence, when the roller 25 is displaced in a pivotal motion with the frame 26, the distance between the contact point P of the roller 25 and the rotary disc 21 and a center Q of the rotary disc 21 does not change, but an angle $\theta$ between a line R extending in the same direction as the axis of rotation of the roller 25 and a tangential line S changes.

Since the rotary disc 21 is always in pressing contact with the roller 25 by force of the spring 24, the roller 25 is rotated due to friction between the rotary disc 21 and the roller 25 according to the rotation of the rotary disc 21. If peripheral velocity of the rotary disc 21 in the tangential direction S at the point P is expressed as V and rotational periphery velocity of the roller 25 as U, $$U \alpha V \sin \theta \tag{1}$$

If the flow quantity of the heat medium is expressed as $q$, the temperature difference of the heat medium between the points before and after the heat exchanger as $\Delta T$ and an average specific heat of the heat medium as $c$, the heat quantity $E$ will be $$E = cq\Delta T \tag{2}$$

In the meanwhile, the rotational velocity of the rotary disc 21 is in proportion to the flow quantity $q$ of the heat medium. Accordingly, $$V \alpha q \tag{3}$$

Since the roller 25 is angularly displaced in proportion to the temperature difference $\Delta T$ of the heat medium, $$\Delta T \alpha \sin \theta \tag{4}$$

Accordingly, from the above proportional expressions (1), (3) and (4), a proportional expression $$U \alpha q \cdot \Delta T \tag{5}$$

is obtained. Also, from the proportional expressions (2) and (5), a proportional expression $$E \alpha U \tag{6}$$

is obtained. This expression (6) shows that the heat quantity is in proportion to the peripheral velocity of the roller 25. Accordingly, the heat quantity can be known by obtaining the number of revolutions of the roller 25 which is rotated by the rotary disc 21.

When the rotary disc 21 is rotated by the rotational force transmitted from the shaft 10 as described above, the roller 25 is rotated due to the friction between the rotary disc 21 and the roller 25 at a rotational velocity which, as will be described later, is in proportion to the angle $\theta$ which in turn is dependent upon the temperature difference. The rotation of the roller 25 is transmitted to the shaft 45 through the shaft 27, gears 30 and 29, the shaft 28, the bevel gears 31 and 32, the shaft 33, the gears 40 and 41, the shaft 42 and the gears 43 and 44. Due to the rotation of the shaft 45, the heat quantity is indicated, in a unit of calorie, on the indicating part 47 of the counter 46. As the displacing lever 50 is displaced rectilinearly due to the variation of the temperature difference and the pin 36 is displaced in a pivotal motion, the shaft 37 and the pointer 38 are also displaced in a pivotal motion integrally with the pin 36, whereby the temperature difference of the heat medium is indicated on the scale plate 39 by the pointer 38.

The maximum angular displacement of the frame 26 and the roller 25 relative to the maximum rectilinear displacement is limited to smaller than 90°. When the axis R of rotation of the roller 25 coincides with the tangential line S of the rotary disc 21, the rotation of the roller 25 becomes zero regardless of the rotation of the rotary disc 21. When the axis R of rotation of the roller 25 is at right angles with the tangential line S of the rotary disc 21, the rotational peripheral velocity of the roller 25 becomes equal to the tangential peripheral velocity of the rotary disc 21 at the point P.

Figure 4:
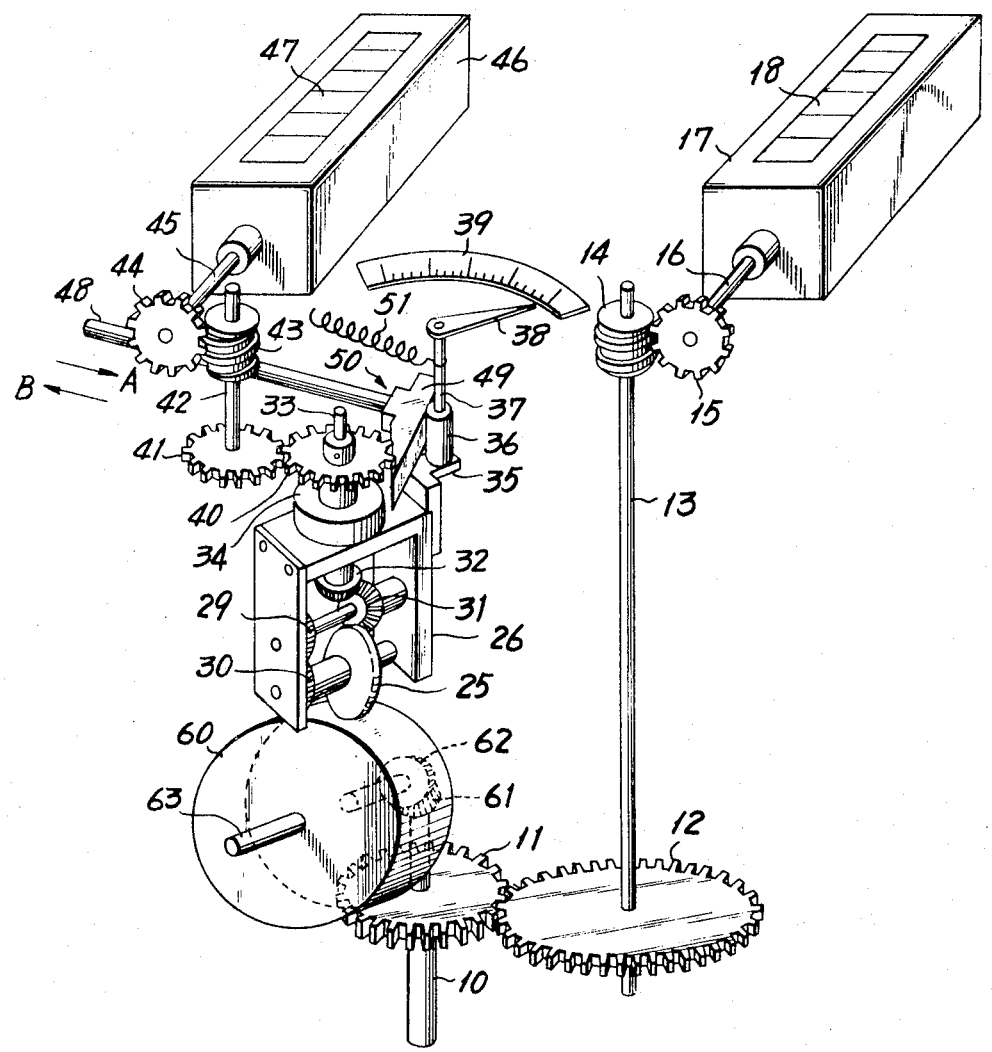
FIG. 4 is a perspective view of another embodiment of the computing apparatus according to the invention.

FIG. 4 is a perspective view of the second embodiment of the apparatus according to the invention. In FIGS. 1 and 4, the same component parts are designated by the same reference numerals and the description thereof will be omitted. The outer peripheral surface of a rotary drum (or a rotary disc) 60 is in abutting contact with a roller 25. The rotary drum 60 is rotated by rotational force transmitted from a shaft 10 through a bevel gear 61 fixedly mounted at the upper end of the shaft 10, a bevel gear 62 which is in mesh with the bevel gear 61 and a shaft 63 carrying the bevel gear 62 at one end thereof. As in the case of the above described first embodiment, the roller 25 is displaced in a pivotal motion about a point at which it is in contact with the drum 60 in response to the displacement of a displacing lever 50 which is displaced due to the variation of the temperature difference. As also in the case of the first embodiment, a counter 46 driven by the roller 25 indicates the heat quantity.

This invention is not limited to these embodiments but various variations and modifications may be made without departing from the scope and spirit of the invention.

What we claim is:

1. A computing apparatus in a calorimeter having a flowmeter which measures a flow quantity of a heat medium passing through a heat exchanger provided for radiating or absorbing heat and temperature difference displacement converting means for oftaning an amount of displacement proportionate to the temperature differences of the heat medium between points before and after said heat exchanger on a flow passage of the heat medium, said apparatus comprising a rotating member which is rotated in a rotational velocity responsive to an output which is the result of measurement of said flowmeter, a roller which is in abutting contact with said rotating member and is rotated due to friction between said roller and said rotating member caused by rotation of said rotating member, a frame rotatably supporting said roller, a displacing means for displacing said frame in a pivotal motion in proportion to the amount of displacement obtained by said temperature difference-displacement converting means, and a heat quantity indicator which receives rotational force from said roller and integrates and indicates the heat quantity, said displacing means causing said frame and said roller to be displaced in a pivotal motion so that the angle between the tangential direction of said rotating member and the axis of rotation of said roller at a contact point of said roller and said rotating member is changed, and said roller rotated at a velocity which is in proportion to a vector component in the direction of rotation of said roller displaced in a pivotal motion of the tangential peripheral velocity of said rotating member at said contact point, said vector component being in proportion to the result of multiplication of the flow quantity of the heat medium and the temperature difference of the heat medium, and said heat quantity indicator indicating the heat quantity by integrating the rotations of the roller.

2. The computing apparatus as defined in claim 1 wherein said roller is pivotally supported on said frame so that the contact point of said roller and said rotating member is on an extending line of the axis of rotation of said frame.

3. The computing apparatus as defined in claim 1 wherein said rotating member is a rotary disc and said roller is in abutting contact with one plane of said rotary disc at a position apart from the center of said rotary disc by a predetermined distance.

4. The computing apparatus as defined in claim 3 which further comprises an energizing means for energizing said rotary disc in a direction to bring it in abutting contact with said roller.

5. The computing apparatus as defined in claim 1 wherein said roller is in abutting contact with the outer peripheral surface of said rotating member having a predetermined radius.

6. The computing apparatus as defined in claim 1 which further comprises a flow quantity indicator which receives revolutions which are output of the measurement of said flowmeter and integrates and indicates the flow quantity of the heat medium.

7. The computing apparatus as defined in claim 1 wherein said displacing means consists of a displacing lever having a pushing portion at the foremost end thereof and being rectilinearly displaced, the pushing portion of said displacing lever being in abutting contact with a part of said frame thereby to displace it in a pivotal motion, and said apparatus further comprising an energizing means for energizing said frame in a direction in which said frame is constantly in contact with the pushing portion of said displacing lever.

* * * * *